(12) United States Patent
Raffius et al.

(10) Patent No.: US 6,223,138 B1
(45) Date of Patent: Apr. 24, 2001

(54) CARRIER FREQUENCY MEASURING METHOD AND APPARATUS

(75) Inventors: Gerhard Raffius, Dreieich; Juergen Pitz, Gernsheim; Roland Sonnenschein, Muenster, all of (DE)

(73) Assignee: Carl Schenck AG, Darmstadt (DE)

( * ) Notice: Subject to any disclaimer, the term of this patent is extended or adjusted under 35 U.S.C. 154(b) by 0 days.

(21) Appl. No.: 09/085,374

(22) Filed: May 26, 1998

(30) Foreign Application Priority Data

May 27, 1997 (DE) ............................................. 197 22 077

(51) Int. Cl.$^7$ ....................................................... G01L 1/00
(52) U.S. Cl. ............................... 702/189; 702/42; 73/1.15
(58) Field of Search ................................. 702/42, 76, 77, 702/189; 73/1.15, 760; 324/657, 666, 680, 706, 725; 327/92; 332/172

(56) References Cited

U.S. PATENT DOCUMENTS

| | | | |
|---|---|---|---|
| 5,057,441 | * 10/1991 | Gutt et al. | ................................. 437/8 |
| 5,088,330 | 2/1992 | Talmadge . | |
| 5,668,480 | * 9/1997 | Nintzel | ................................. 324/709 |
| 5,777,235 | 7/1998 | Altwein . | |
| 5,821,417 | * 10/1998 | Naruo et al. | ........................... 73/491 |

FOREIGN PATENT DOCUMENTS

| | | |
|---|---|---|
| 3125133C2 | 1/1983 | (DE) . |
| 4417228 | 11/1995 | (DE) . |
| 4417228A1 | 11/1995 | (DE) . |
| 4435174A1 | 3/1996 | (DE) . |
| 19548390A1 | 6/1996 | (DE) . |

OTHER PUBLICATIONS

"Handbuch des Wägens" (Hand Book of Weighing), 2nd Edition; Braunschweig, Germany, 1989, p. 551, M. Kochsiek.

"Für hochgenaues Messen", by Reinhard Bertermann, 312 Elektrotechnik 68, Nov. 25, 1986, No. 20, Würzburg, W. Germany; pp. 551.

* cited by examiner

Primary Examiner—Patrick Assouad
(74) Attorney, Agent, or Firm—W. F. Fasse; W. G. Fasse

(57) ABSTRACT

In a signal measuring method and apparatus, a digital signal processor (5) including a digital signal generator (5A) generates a digital signal, which is converted by a digital-to-analog converter (2) into a sinusoidal analog signal that is applied as a supply voltage to the transducers, such as load cell strain gages arranged in a bridge circuit (1). The analog supply voltage signal is modulated by the measurement voltage in the bridge circuit (1). The resulting modulated signal is amplified if necessary in an amplifier (3), and is then digitalized in an analog-to-digital converter (4) operating with a sampling frequency at least twice the carrier frequency and preferably corresponding to a whole number multiple thereof. The digital signal processor (5) carries out a Fourier transform of the digitalized signal to calculate the magnitude and phase of the measurement voltage, which may then be used for the complex calculation of zero point compensations and adjustment calibrations.

25 Claims, 2 Drawing Sheets

CARRIER FREQUENCY MEASURING METHOD AND APPARATUS

PRIORITY CLAIM

This application is based on and claims the priority under 35 U.S.C. §119 of German Patent Application 197 22 077.0, filed on May 27, 1997.

FIELD OF THE INVENTION

The invention relates to a method and apparatus for measuring the output of a sensor or pick-up transducer in a bridge circuit using a carrier frequency.

BACKGROUND INFORMATION

Various methods are known for measuring or evaluating the measurement output of foil strain gage transducers arranged in a bridge circuit. However, difficulties arise in such measuring methods because the strain gage transducer bridge circuit typically outputs a measurement voltage of only a few millivolts, even under maximum load, whereby this small measurement voltage must be amplified in corresponding measuring amplifiers for further processing, evaluation and transmission. In order that these analog measurement values can be transmitted and evaluated in microprocessor circuits with the lowest possible distortion or interference, the analog output signals are usually converted into digital measurement values, which are then provided to a microprocessor for further processing.

Such a typical measuring method for use in connection with a carrier frequency measuring amplifier, with transducers arranged in a bridge circuit, is described in M. Kochsiek, "Handbuch des Waegens" (Hand Book of Weighing), 2nd Edition, Braunschweig, Germany, 1989, page 551. The circuit and method according to this publication include an oscillator that generates an alternating voltage having a carrier frequency, which in turn is modulated with a measurement value by the transducer circuit. The resulting amplitude modulated carrier is then amplified in an input amplifier. This input amplifier is selective and transmits only frequencies in the range of the carrier frequency. The amplified carrier voltage is then demodulated, the remaining signal components of the carrier are filtered out, and the resulting measurement signal is finally provided to an output amplifier, which outputs the amplified measurement signal.

In order to allow further measured value transmission and processing in a microprocessor system, the above described analog output signal would have to be converted to a corresponding digital signal in an analog-to-digital converter. The demodulation carried out before the analog-to-digital conversion is typically carried out by means of a phase controlled rectifier, which always necessarily involves a loss or degradation of information, which in turn makes it difficult to achieve an exact calibration and evaluation of the measurement results.

German Patent Laying-Open Publication 4,417,228 (Altwein) also describes a carrier frequency measuring method with measuring transducers in a bridge circuit. According to this reference, before transmission of the measured value, the measurement signal is modulated by means of a modulation amplifier, amplified, and then again demodulated by means of a phase controlled bridge rectifier. However, in this process it must first be ensured before carrying out the demodulation, that the carrier frequency applied to the bridge is exactly in phase with the measurement voltage. For this reason, any existing phase differences are compensated or tuned-out by means of a manual phase compensation, upon beginning the signal processing. Since in practice new phase shifts arise over time, and such phase shifts lead to measurement inaccuracies, it is necessary to repeat the above-mentioned manual phase compensation measures at certain specified time intervals.

SUMMARY OF THE INVENTION

In view of the above it is the aim of the invention to provide a carrier frequency measuring method of the above described general type, which is improved in such a manner as to increase the measurement accuracy and to ensure that the measurement accuracy remains constant over time. The invention further aims to avoid or overcome the other disadvantages of the prior art, and to achieve additional advantages, as apparent form the present description. The invention also aims to provide an apparatus circuit arrangement for carrying out the method and achieving the previously mentioned objects.

The above objects have been achieved in a measuring method according to the invention, for measuring the output of transducers in a bridge circuit. An alternating voltage is applied as a carrier voltage to the measuring bridge, and the measuring bridge modulates the carrier with a measurement value to produce a modulated measurement voltage. This modulated measurement voltage, which accordingly contains or comprises the measurement value, is then further processed for determining or evaluating the measurement value. Particularly, the modulated measurement voltage is directly provided to an analog-to-digital converter which operates at a sampling rate that is at least twice the carrier frequency. Then, the digitalized measurement voltage is provided to a digital signal processor, which carries out a Fourier transform via hardware and/or software so as to calculate or determine the magnitude and the phase of a resultant measurement signal from the digitalized measurement voltage.

The above objects have further been achieved by a circuit arrangement according to the invention, especially for carrying out the above method. The circuit arrangement includes a signal generator for generating an alternating voltage as a carrier, which is connected to the input of the transducer bridge circuit. The output of the transducer bridge circuit is connected through an amplifier circuit directly to an analog-to-digital converter, which in turn is further connected to a digital signal processor. According to particular preferred features of the invention, the sampling rate of the analog-to-digital converter is a whole number multiple of the carrier frequency. Furthermore, a digital reference signal may be formed by analog-to-digital conversion from the analog input voltage of the bridge circuit, whereby this digital reference signal may be taken into account for calculating the magnitude and the phase of the measurement voltage. The circuit arrangement may be embodied according to the four-wire connection technology or the six-wire connection technology for the connection between the bridge circuit and the measuring circuit. The amplifier circuit, the converter circuits, and the digital signal processor may all be integrated in a transducer housing.

A major advantage of the invention is that it does not require demodulation of the modulated signal, because of the employed direct digitalization. For this reason, it is simultaneously possible to avoid the need for costly and complicated narrow band filters that are typically required after the demodulation in the prior art. Moreover, a necessary taring or zero point compensation can be carried out by a complex analysis, i.e. using complex values, by means of a microprocessor using the digitalized measurement values, whereby the measurement accuracy can be maintained.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
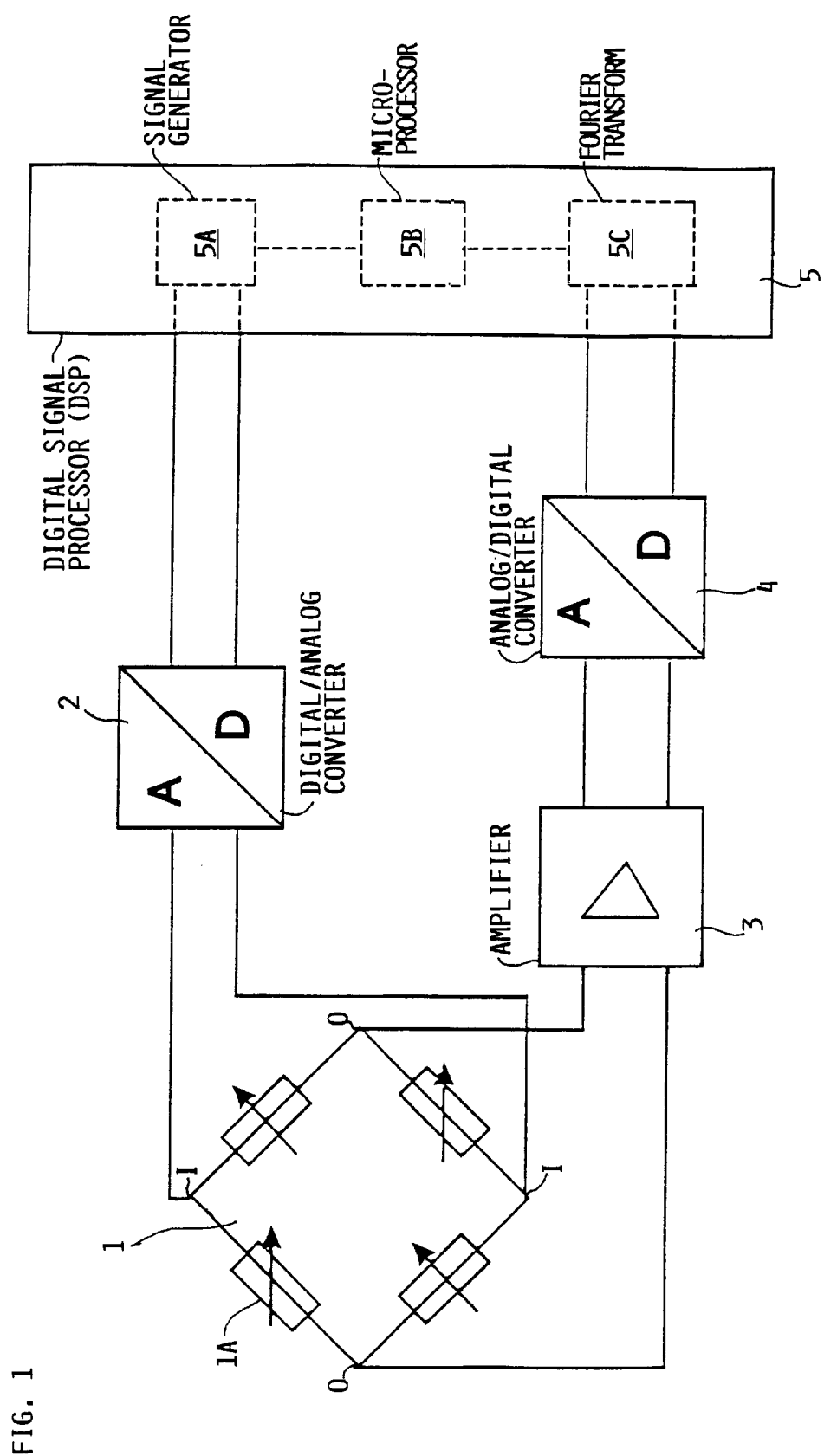
FIG. 1 is a schematic block diagram of a carrier frequency measuring circuit in a four-wire connection embodiment.

FIG. 1 schematically shows the construction of a carrier frequency measuring circuit according to the invention, in which a digital signal processor circuit 5 is connected to a digital input of a digital-to-analog converter 2, which in turn provides a carrier frequency to the inputs I of a transducer bridge circuit 1. The bridge circuit 1 modulates the carrier frequency with a measurement value. The resulting modulated signal is provided from the outputs O of the bridge circuit 1, and is then amplified, digitalized and delivered back to the digital signal processor circuit 5 for evaluation. The details of this circuit and its operation will now be described.

The digital signal processor circuit (DSP) 5 includes a signal generator 5A, a microprocessor 5B, and a Fourier transform circuit or module 5C. These subcomponents can all be integrated or incorporated in an integrated circuit and particularly a microprocessor circuit. The signal generator 5A generates a digital carrier frequency voltage. This digital signal is applied to the inputs of the digital-to-analog (D/A) converter 2, which converts he digital carrier frequency voltage into a corresponding analog sinusoidal alternating voltage that will be used as a carrier voltage. In this context, the frequency is predominantly dependent on the measurement task to be carried out by the transducer bridge circuit 1, with reference to the transient response time and the rate of change of the measurement signal, as is well understood by persons of ordinary skill in the art.

For example, such transducer bridge circuits are predominantly used for force measurement in the field of weighing technology and for rotational moment measurements in the field of vehicle testing technology. However, the inventive circuitry is also applicable to any other desired field of application that makes use of measuring bridge circuits, with various types of sensors or transducers. In the particular example embodiment illustrated in FIG. 1, the transducer bridge circuit 1 is a measuring bridge or weigh bridge circuit 1 comprising one or more force transducers, load cells or weigh cells respectively equipped with one or more foil strain gage elements 1A arranged in a Wheatstone bridge circuit. Typically, in connection with the inventive circuit arrangement, the bridge circuit 1 is embodied as a full bridge, but may alternatively be embodied as a half bridge or quarter bridge, as generally understood in the art.

The sinusoidal alternating voltage having a constant or uniform carrier frequency, which is produced by the D/A converter 2, is applied as a supply voltage to the inputs I of the transducer bridge circuit 1. When a load is applied to the force transducers or weigh cells equipped with the strain gages 1A, a measurement voltage signal is superimposed onto the carrier frequency voltage. As a result, the measuring bridge circuit 1 generates an amplitude modulated measurement voltage as an output signal, which is proportional to the load or load changes applied to the force transducers or weigh cells. This modulated analog measurement signal generally has an amplitude or magnitude on the order of a few millivolts, e.g. less than 10 millivolts, so that this output signal is generally first amplified in an amplifier circuit 3, and is then directly provided to an analog-to-digital (A/D) converter 4. Alternatively, the amplifier 3 may be omitted if amplification of the signal is not necessary. The A/D converter 4 has a sampling frequency of at least twice the carrier frequency, and preferably equal to a whole number multiple of the carrier frequency. In practice, it has been found to be advantageous to use a sampling frequency corresponding to a whole number multiple of the carrier frequency, because it was surprisingly and unexpectedly discovered that a demodulation of the modulated measurement voltage can be omitted when using such a sampling frequency.

The digitalized measurement voltage output by the A/D converter 4 is provided back to the digital signal processor 5 for evaluation. Specifically, a Fourier transform module 5C in the digital signal processor 5 carries out a software or hardware Fourier transform of the digitalized measurement voltage to calculate or determine both the magnitude and the phase of the measurement voltage. The determined magnitude and phase characterizes the original measurement information provided by the measuring bridge circuit 1. In this manner, a simple circuit arrangement and simple process make it possible to computationally carry out a calibration or a zero point compensation of a weighing system or a vehicle testing stand, for example, whereby it is also possible to take into account any phase variations over the loading range. Particularly, by carrying out a single testing run of the measuring circuitry over the operational load range, it is possible to determine the transmission and measuring behavior of the entire measuring circuit. Thereby any phase variation in connection with a dead load variation can be computationally taken into account.

Since the above described A/D converter circuits 4 as well as digital signal processors 5 are commercially available as integrated circuits, these components can be directly incorporated into the transducer housing for the respective transducer such as a weigh cell or load cell. In this manner, a directly displayable or further processable digital output signal can already be provided immediately at the outputs of the transducer module. Such a digital output signal may be transmitted over relatively long transmission distances, without suffering loss, degradation, or falsification of the measurement value contained within the signal. In this case it is possible to advantageously embody the transducer module in accordance with the four-conductor or four-wire connection technology, as shown in FIG. 1. In other words, a simple connection of four wires to the bridge circuit 1 is sufficient to provide reliable and accurate output signals.

Figure 2:
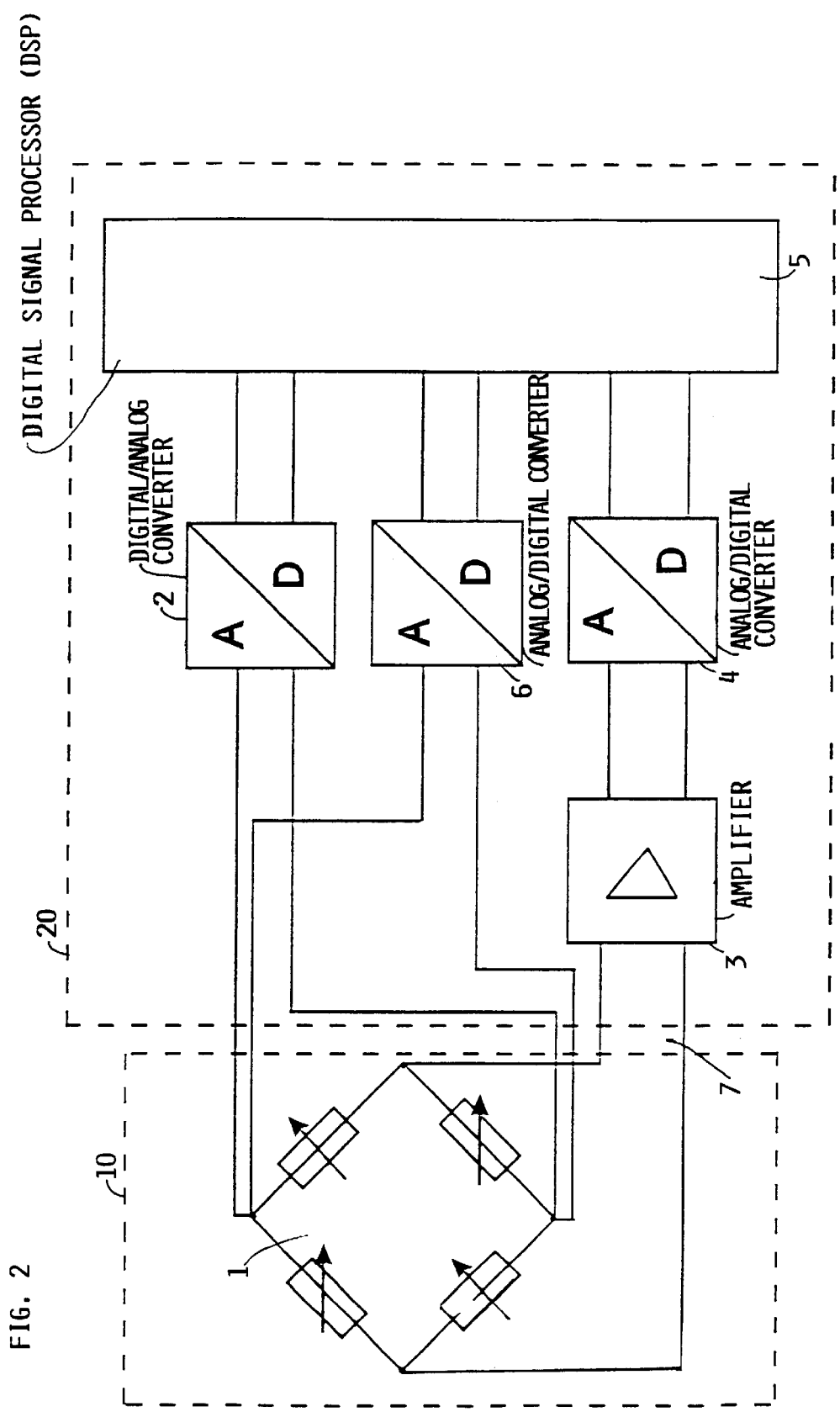
FIG. 2 is a schematic block diagram of a carrier frequency measuring circuit in a six-wire connection embodiment.

FIG. 2 schematically shows an alternative embodiment, in which the A/D converter is not to be integrated directly in the transducer module, but instead an analog signal is to be transmitted from the bridge circuit 1 within the transducer module 10, over a relatively great transmission distance, to the evaluation circuit module 20. In this case, the carrier frequency measurement circuitry is carried out in accordance with six-conductor or six-wire connection technology. Namely, since this situation requires relatively long measurement signal conductors 7 between the bridge circuit 1 of the transducer module 10 and the integrated circuit components 2, 3, 4, 5 and 6 of the evaluating circuit module 20, it is necessary to provide a reference voltage to avoid the possible effects of signal decay of the analog measurement signal on the conductors 7. In order to achieve this, an additional analog-to-digital A/D converter 6 is connected between the supply voltage inputs of the bridge circuit 1 and the digital signal processor 5. Otherwise, the circuit of FIG. 2 corresponds to that of FIG. 1. The A/D converter 6 receives the analog supply voltage applied to the bridge circuit 1 as an analog input and converts it to a corresponding digital output signal acting as a reference signal, which is monitored by the digital signal processor 5 for taking the actual transmission characteristics of the measuring circuit over the entire distance thereof into account when determining the magnitude and phase of the measurement voltage.

The invention is not limited to the above described example embodiments, but rather is also applicable to all transducer bridge circuits and carrier frequency measuring methods for use in connection therewith. Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. Each of the particular circuit components described herein can be physically embodied using any known circuit arrangement or component, for example any commercially available A/D converters, D/A converters, bridge circuits, and digital signal processor circuits including a signal generator and a Fourier transform module.

What is claimed is:

1. A method of obtaining and evaluating a measurement voltage provided by a bridge circuit including at least one measuring transducer, comprising the following steps:
   a) applying, to at least one supply voltage input of said bridge circuit, an alternating carrier voltage having a carrier frequency;
   b) modulating said alternating carrier voltage with a measurement value in said bridge circuit to form a modulated measurement voltage at at least one signal output of said bridge circuit;
   c) converting said modulated measurement voltage into a digital measurement voltage, using an analog-to-digital conversion sampling rate of at least twice said carrier frequency; and
   d) obtaining a magnitude and a phase of said measurement value from said digital measurement voltage by carrying out a Fourier transform on said digital measurement voltage.

2. The method according to claim 1, further comprising a step of amplifying said modulated measurement voltage between said steps b) and c), and carrying out no further processing of said modulated measurement voltage between said steps b) and c) other than said amplifying.

3. The method according to claim 2, wherein said sampling rate is a whole number multiple of said carrier frequency.

4. The method according to claim 1, wherein said step c) is carried out directly following said step b) with no additional processing of said modulated measurement voltage between said steps b) and c).

5. The method according to claim 4, wherein said sampling rate is a whole number multiple of said carrier frequency.

6. The method according to claim 1, wherein said sampling rate is a whole number multiple of said carrier frequency.

7. The method according to claim 1, wherein said step c) is carried out using an analog-to-digital converter, and said step d) is carried out using a digital signal processor circuit.

8. The method according to claim 1, further comprising a preliminary step of generating said alternating carrier voltage by generating a digital carrier signal and converting said digital carrier signal into said alternating carrier voltage by carrying out a digital-to-analog conversion thereof.

9. The method according to claim 1, further comprising a step of generating a digital reference signal by carrying out an analog-to-digital conversion of said alternating carrier voltage applied to said at least one supply voltage input of said bridge circuit, and wherein said step d) of obtaining said magnitude and said phase of said measurement value further comprises evaluating said digital reference signal.

10. The method according to claim 1, wherein said modulated measurement voltage has a signal magnitude of less than 10 millivolts.

11. The method according to claim 1, not including any demodulation step, and not including any narrow band filtering step.

12. The method according to claim 1, further comprising a step of applying a test condition to said at least one measuring transducer and carrying out a complex calibration of said bridge circuit using said magnitude and said phase of said measurement value determined in said step d).

13. An apparatus for obtaining and evaluating a measurement signal, comprising:
   a bridge circuit including at least one measurement transducer, at least one supply voltage input, and at least one signal output,
   a signal generator connected to said at least one supply voltage input,
   an analog-to-digital converter having at least one analog input connected to said at least one signal output, and having at least one digital output, and
   a digital signal processor connected to said at least one digital output.

14. The apparatus according to claim 13, further comprising at least one conductor, wherein said at least one analog input is directly connected by said at least one conductor to said at least one signal output without any interposed signal processing device.

15. The apparatus according to claim 13, further comprising an amplifier interposed between said at least one signal output and said at least one analog input, wherein said at least one analog input is directly connected through said amplifier to said at least one signal output.

16. The apparatus according to claim 15, wherein said bridge circuit includes two of said supply voltage inputs and two of said signal outputs and is connected to said signal generator and to said amplifier according to a four-wire connection technology comprising two supply conductors connecting said signal generator to said two supply voltage inputs and two signal conductors connecting said two signal outputs to said amplifier.

17. The apparatus according to claim 16, wherein said signal generator is a digital signal generator, and further comprising a digital-to-analog converter interposed between said signal generator and said supply voltage inputs.

18. The apparatus according to claim 15, further comprising an analog-to-digital reference converter having at least one digital output connected to said digital signal processor and having at least one analog input, wherein said bridge circuit includes two of said supply voltage inputs and two of said signal outputs and is connected according to a six-wire connection technology comprising two supply conductors connecting said signal generator to said two supply voltage inputs, two signal conductors connecting said two signal outputs to said amplifier, and two reference conductors connecting said two supply voltage inputs to said at least one analog input of said analog-to-digital reference converter.

19. The apparatus according to claim 18, wherein said signal generator is a digital signal generator, and further comprising a digital-to-analog converter interposed between said signal generator and said supply voltage inputs.

20. The apparatus according to claim 13, wherein said signal generator is a digital signal generator, and further comprising a digital-to-analog converter interposed between said signal generator and said at least one supply voltage input.

21. The apparatus according to claim 20, wherein said signal generator is incorporated in said digital signal processor.

22. The apparatus according to claim 20, further comprising an amplifier interposed between said at least one signal output and said at least one analog input, and a transducer housing in which said bridge circuit, said amplifier, said analog-to-digital converter, said digital-to-analog converter, and said digital signal processor are arranged and housed.

23. The apparatus according to claim 13, wherein said digital signal processor comprises and incorporates said signal generator, a microprocessor and a Fourier transform module.

24. The apparatus according to claim 13, not including any demodulator, and not including any narrow band filter.

25. The apparatus according to claim 13, wherein said bridge circuit is a Wheatstone bridge and said at least one measurement transducer comprises at least one strain gage.

* * * * *